(12) United States Patent
Schertz et al.

(10) Patent No.: US 8,167,526 B2
(45) Date of Patent: May 1, 2012

(54) APPARATUS FOR AUTOMATICALLY UNLOADING AGRICULTURAL MATERIAL FROM A STORAGE BAG

(76) Inventors: Scott F. Schertz, Winona, KS (US); Glen Kemp, Winona, KS (US)

( * ) Notice: Subject to any disclaimer, the term of this patent is extended or adjusted under 35 U.S.C. 154(b) by 0 days.

(21) Appl. No.: 12/891,798

(22) Filed: Sep. 27, 2010

(65) Prior Publication Data

US 2011/0014019 A1 Jan. 20, 2011

Related U.S. Application Data

(63) Continuation of application No. 11/752,055, filed on May 22, 2007, now Pat. No. 7,802,956.

(51) Int. Cl.
*B65B 21/02* (2006.01)

(52) U.S. Cl. ......... 414/403; 414/411; 414/296; 414/307

(58) Field of Classification Search ................... 414/403, 414/411, 412, 501, 507, 488, 296, 307; 296/15
See application file for complete search history.

(56) References Cited

U.S. PATENT DOCUMENTS

| 4,420,119 A * | 12/1983 | Johnson ................... 241/101.71 |
| 2004/0006957 A1 * | 1/2004 | Sheidler et al. ............ 56/10.2 G |

* cited by examiner

*Primary Examiner* — Saul Rodriguez
*Assistant Examiner* — Willie Berry, Jr.
(74) *Attorney, Agent, or Firm* — Invention Protection Associates, LLC

(57) ABSTRACT

An unloading apparatus capable of automatically unloading agricultural materials from a storage bag is disclosed. The unloading apparatus includes a drive mechanism for advancing the apparatus along the direction of an elongate storage bag, a collection mechanism for withdrawing material from the bag, and mechanisms for both sensing resistance imposed on the advancing apparatus by material in the bag and controlling further advancement of the apparatus in accordance with the level of that resistance.

5 Claims, 6 Drawing Sheets

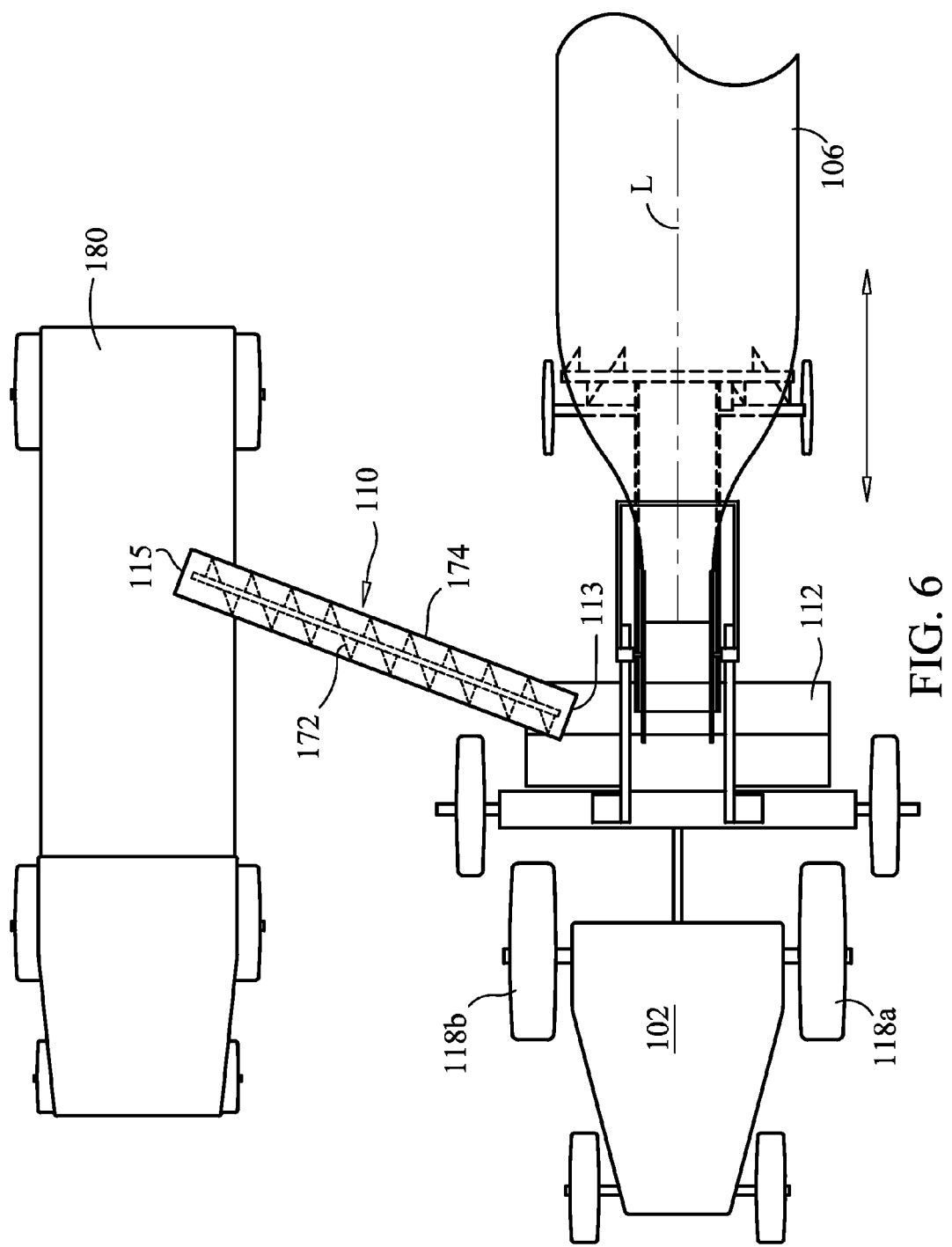

APPARATUS FOR AUTOMATICALLY UNLOADING AGRICULTURAL MATERIAL FROM A STORAGE BAG

This application is a continuation-in-part application that claims the benefit of application Ser. No. 11/752,055 filed May 22, 2007. Furthermore, application Ser. No. 11/752,055 is hereby incorporated by reference.

BACKGROUND

The present invention generally relates to agricultural bag unloading machines. It more particularly relates to a machine that is capable of removing agricultural material from an elongate storage bag, while its progression further into the bag is automatically controlled according to the level of resistance imposed by material remaining in the bag.

Today, animal feed and other agricultural materials are often stored in long, tubular storage bags that rest on the ground, rather than in traditional vertical silos and bunkers. Because of the volume of material that they hold when filled, these storage bags can become tremendously heavy and difficult to lift or otherwise move. Therefore, their contents must be removed while they sit in place. Once removed, the contents are usually deposited into a carrier and hauled to another location where the agricultural material may be needed.

In order to facilitate the emptying of these agricultural bags, unloading machines of various constructs have been developed in the prior art. These machines typically have a frame assembly that features a mechanism(s) for engaging material within the bag and removing it from the bag while the machine advances along the length of the stationary bag. Examples of such machines are disclosed in U.S. Pat. No. 6,109,552 to Strankman and U.S. Pat. No. 4,420,119 to Johnson.

Of course, as all agricultural storage bags are not identical, neither is the texture and density of the various agricultural materials that these bags may hold. Consequently, the ideal rate at which an unloading machine should progress further within a bag so as to avoid becoming overloaded, or "jammed," with material that it is attempting to collect and remove depends upon the rate at which the bag is actually being emptied. However, one can appreciate that using the same unloading machine to unload identical bags containing different materials may render different emptying rates because of differences in characteristics of the bags' contents. Moreover, variations in the diameters of agricultural bags even further impact emptying rates, and the removal capacities of different machines obviously can vary.

While machines adapted specifically for unloading heavy agricultural storage bags are well-known in the prior art, the proposition of controlling the drive mechanisms of those machines in accordance with material unloading factors experienced during an actual unloading session is not. For example, it may be appropriate to intermittently start and stop a machine from advancing against material or to otherwise modify travel speed in order for a machine to maximize its unloading rate without becoming overloaded.

Therefore, it can be appreciated that there remains a need for a bag unloading machine that is capable of sensing the rate at which material is being removed from a bag, by virtue of sensing resistance forces imposed against the advancing machine by material remaining in the bag, and then modifying its further advancement into the bag in accordance with that sensed resistance to advancement so as to avoid overloading or jamming the machine's collection mechanism with material. The automatic unloading apparatus of the present invention substantially fulfills this outstanding need.

SUMMARY

It is an object of the present invention to provide an apparatus for automatically unloading agricultural material from a storage bag.

In one aspect of the invention, the apparatus comprises a drive mechanism for propelling the apparatus, along with a frame assembly that carries collection and discharge mechanisms (sometimes, herein, collectively referred to as simply a "collection mechanism") for collecting and removing material from within a storage bag. More specifically, the collection mechanism is configured to remove material from an open ended bag as the frame assembly advances along the direction of the bag towards its closed end. The collection aspect of the collection mechanism may include a collection auger that is disposed within the bag to gather grain, as well as a cooperating conveyor that collects material from the auger and delivers it to a temporary holding bin. The discharge aspect of the collection mechanism may feature, for example, a second auger having a first end positioned at the temporary holding bin and a second end positioned at a storage receptacle that is not part of the apparatus in order to transfer the material from the present unloading apparatus to a separate storage and/or transport apparatus. Finally, the drive mechanism may be integral to the frame assembly or selectively attached thereto. In any event, it is capable of propelling the frame assembly along the direction of the storage bag, even as the apparatus experiences some level of resistance to its continued movement due to its impinging against the bagged material.

In another aspect of the invention, the present apparatus further comprises an actuation assembly and/or a sensor arrangement that cooperates with both the collection mechanism and the drive mechanism. The actuation assembly or sensor arrangement is configured to recognize the level of resistance to further advancement that the apparatus is encountering due to the presence of material within a bag and to then modify the activity of the drive mechanism as may be necessary to inhibit material overloading of the collection mechanism.

BRIEF DESCRIPTION OF THE DRAWINGS

FIG. 6 is a top plan view of the unloader of the FIG. 1, the apparatus being shown cooperating with a transport vehicle in accordance with the present disclosure.

DETAILED DESCRIPTION OF THE PREFERRED EMBODIMENTS

The present disclosure is directed to an apparatus for advancing along the direction of an agricultural material storage bag and unloading its material contents in an automatically controlled manner dictated by fluctuations in resistance to advancement imposed by the bag or its remaining contents. As will become apparent from the discussion below in connection with the accompanying drawings, the present disclosure has particular applicability to unloading machines used for removing agricultural material from large, elongate storage bags. However, those having skill in the art should appreciate that the present disclosure has general applicability to motor driven machines used for collecting loose material.

Figure 1:
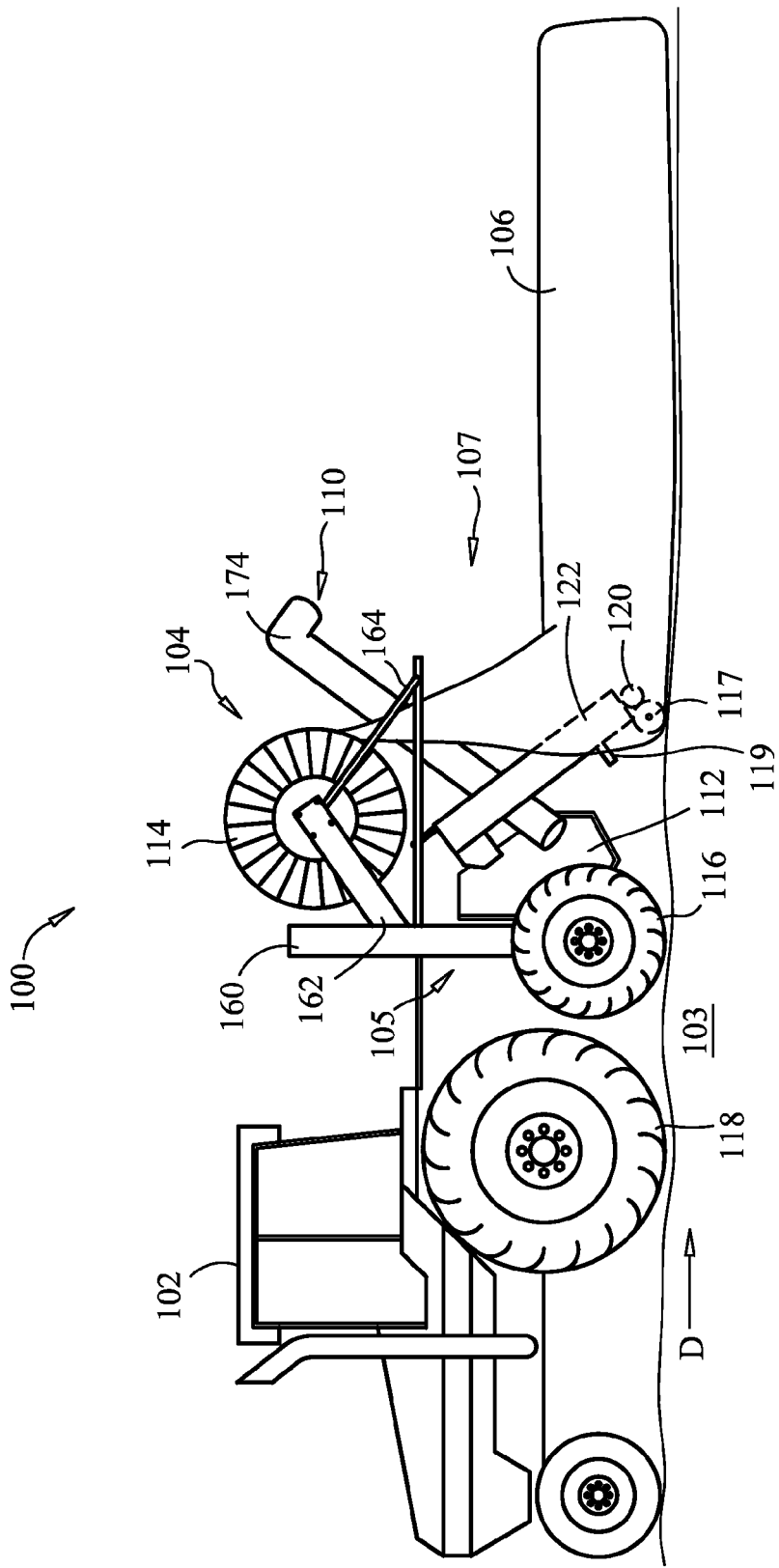
FIG. 1 is a left elevational view of an apparatus for automatically unloading material from a storage bag in accordance with an embodiment of the present disclosure, the apparatus being shown with a tractor attached thereto.

Referring now to FIG. 1, there is illustrated a bag unloading machine, or unloader 100, operating to remove agricultural material (not shown) from an elongate storage bag 106. Typically, an agricultural storage bag is fabricated from a polymeric material, such as polyethylene, and is available in a broad range of diameter and length sizes that are each suited for particular storage requirements. An example of one such storage bag intended for operation upon by the present invention has a diameter (width) of 9 ft. and a length of 300 ft and is manufactured by AT Plastics, Inc. of Alberta, Canada. However, it should be understood that virtually any commercially available agricultural storage bag can be operated upon by the present unloader 100.

The agricultural material to be unloaded from the bag 106 can be unthreshed grains or seeds (e.g., corn, wheat, rice, grasses, etc.), silage or any other agricultural material that is capable of being stored in such a bag. Furthermore, it should be understood that the unloader 100 is not limited in its operation to unloading agricultural materials. In fact, it could be operated to remove from storage bags a plethora of loose materials, such as sand, gravel and dirt.

As depicted in FIG. 1, the unloader 100 may be operated with a separate guiding mechanism, such as a farm tractor 102 which is left in neutral gear to roll freely, but can be steered as necessary to correct any wayward movements of the unloader 100 during its operation. The tractor 102 can be secured to the front end 105 of the unloader's frame assembly 104 in a fashion that enables the tractor 102 to be pulled by the unloader 100. Furthermore, the tractor 102 can also be used to supply power to the unloader 100. If it does, the tractor 102 should be considered an external drive mechanism operable with the unloader 100. However, as will be described, a preferred embodiment of the unloader 100 is equipped with its own onboard drive system that enables the unloader 100 to move and operate without the aid of the tractor 102 or other external drive mechanism.

Figure 2:
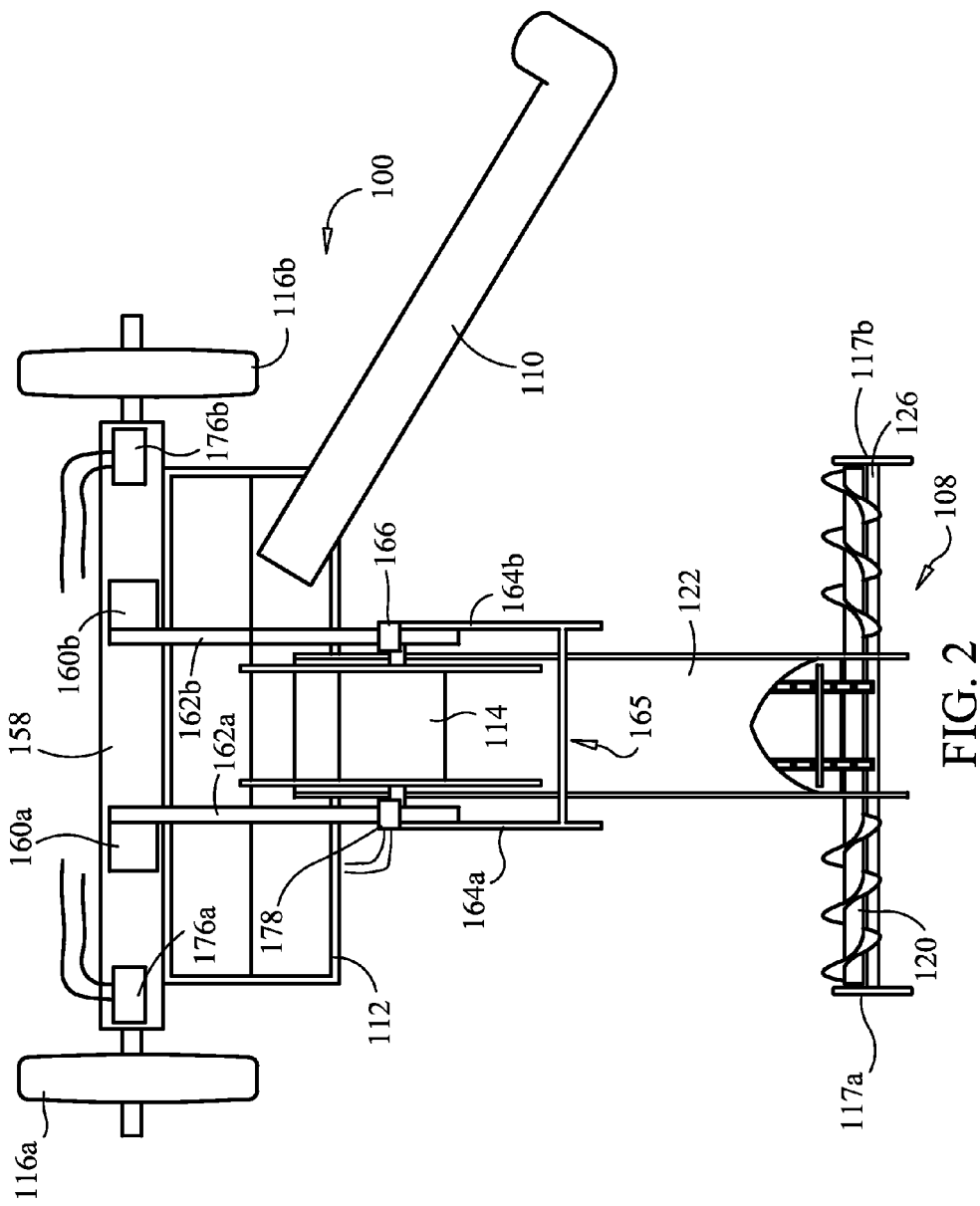
FIG. 2 is a top plan view of the unloading apparatus of FIG. 1.

Referring now to FIGS. 1 and 2, the frame assembly 104 includes a pair of powered drive wheels 116 situated at its front end 105. The drive wheels 116 are supported at the opposite ends of a lateral support member 158 of the frame assembly 104, and they, along with the motor(s) that power them, form the unloader's internal drive mechanism. The drive wheels 116 can be independently powered and controlled by separate motors. For example, FIG. 2 shows an embodiment of an internal drive mechanism in which both drive wheels 116a, 116b are provided with separate drive motors 176a, 176b. Nevertheless, irrespective of the exact configuration of the drive mechanism employed, the drive wheels 116 and a rearward pair of support wheels 117 (discussed below) allow the unloader 100 to travel along a direction D substantially parallel to a lengthwise axis L of the storage bag 104 (see FIG. 6) during unloading operation.

Figure 3:
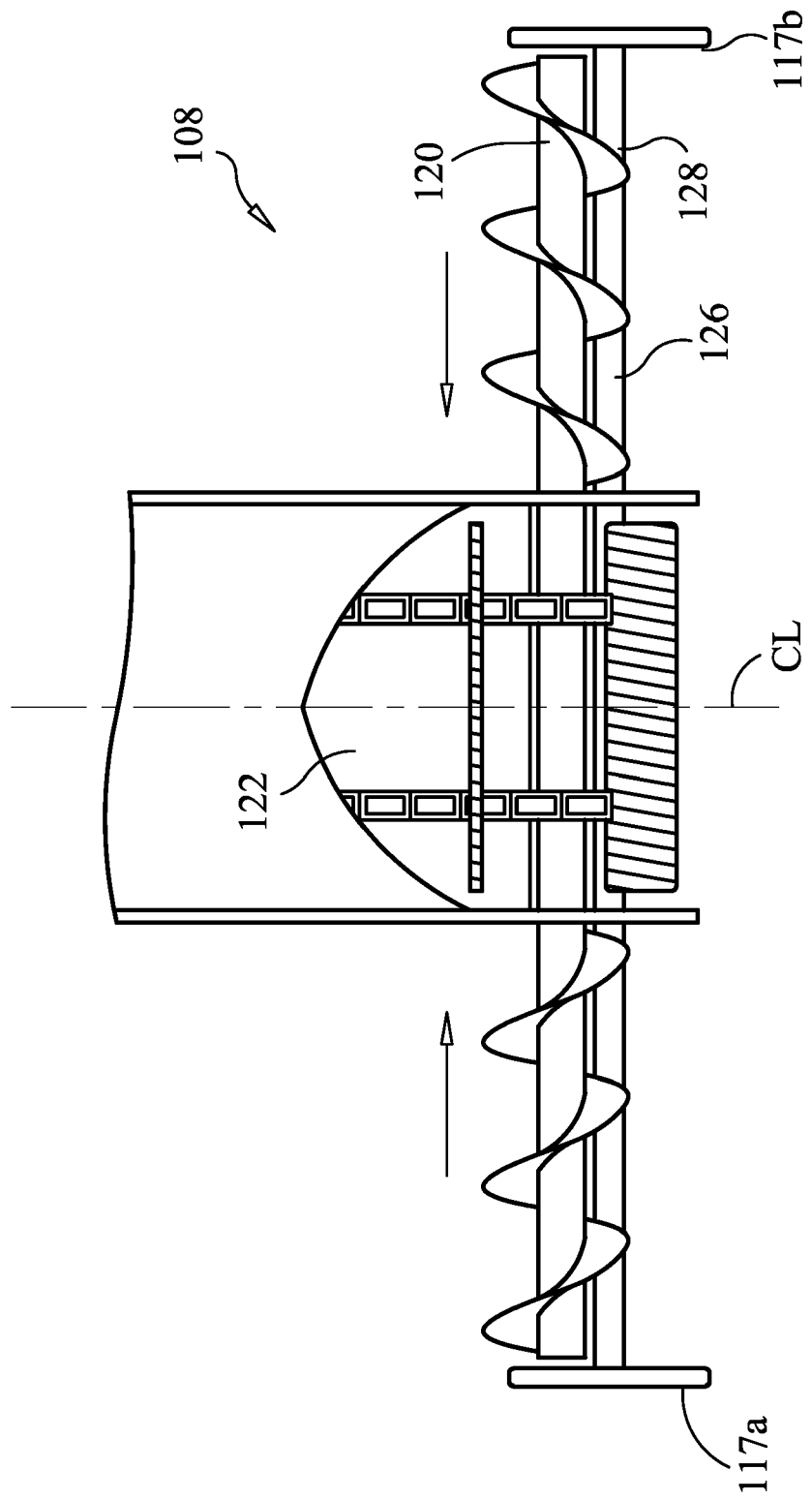
FIG. 3 is an exploded, top plan view of a rearward portion of a collection mechanism in accordance with the present disclosure.

The frame assembly 104 includes a collection mechanism that will, hereinafter, be subdivided into a description of both a collection assembly 108 and a discharge assembly 110. The collection assembly 108—which is secured to and situated near the rear end 107 of the frame assembly 104—is for removing material from the storage bag 106. FIG. 3 is an exploded view of a rearward portion of the collection assembly 108 of the preferred embodiment. As shown, in a preferred embodiment of the invention, the collection assembly 108 comprises a laterally disposed auger 120 configured to engage material stored within the storage bag 106, a longitudinally disposed conveyor 122 configured to remove material from the bag 106 and a pair of support wheels 117a, 117b which are connected by an axle 126 that is secured to the conveyor 122. Preferably, the lateral distance between the two support wheels 117a and 117b can be adjusted to correspond, substantially, to the diameter of the particular storage bag 106 that the collection assembly 108 is to be inserted within.

Figure 4:
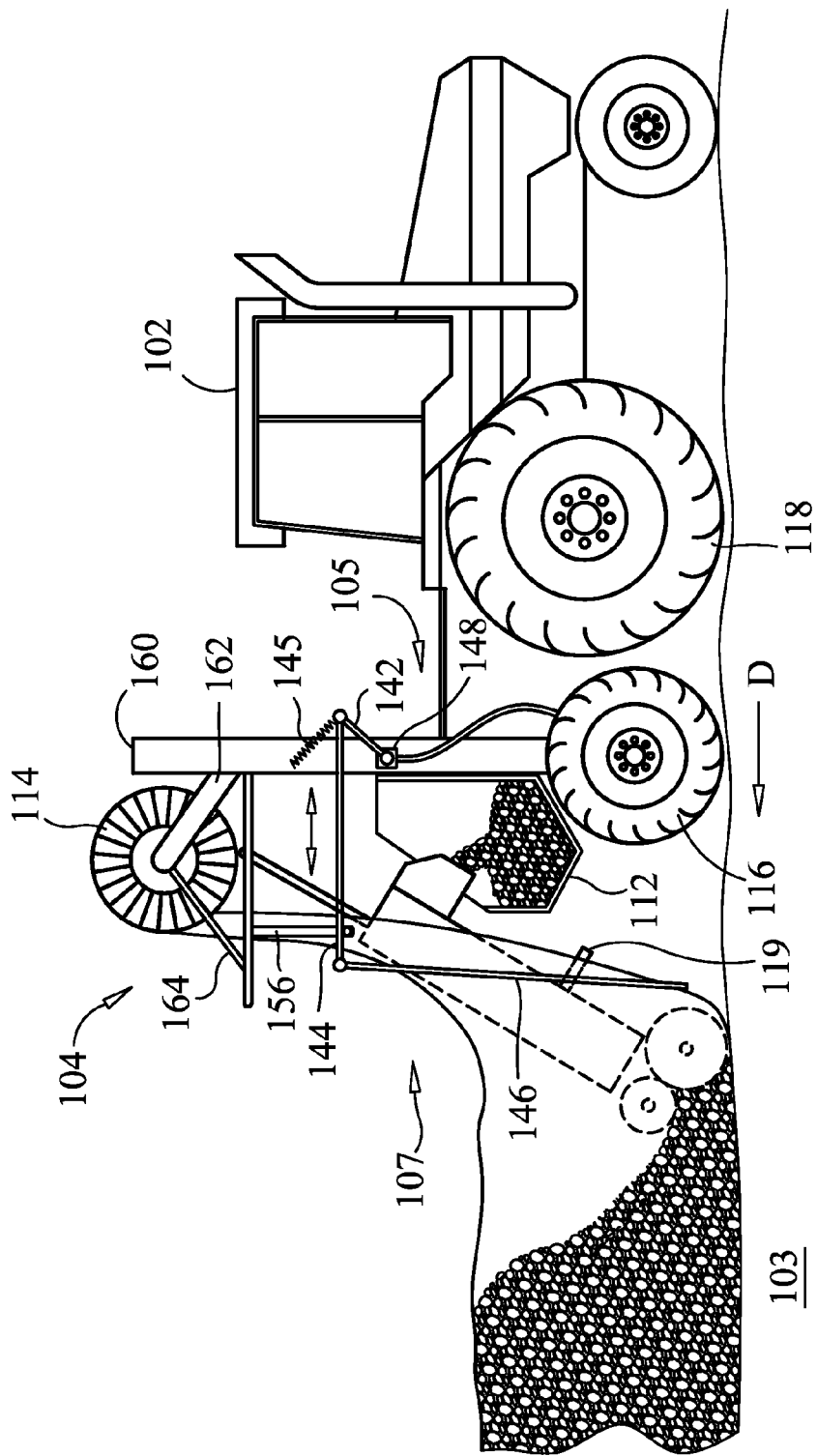
FIG. 4 is a fragmentary, right elevational view of the unloading apparatus of FIG. 1, the apparatus being shown collecting material from within a storage bag.
Figure 5:
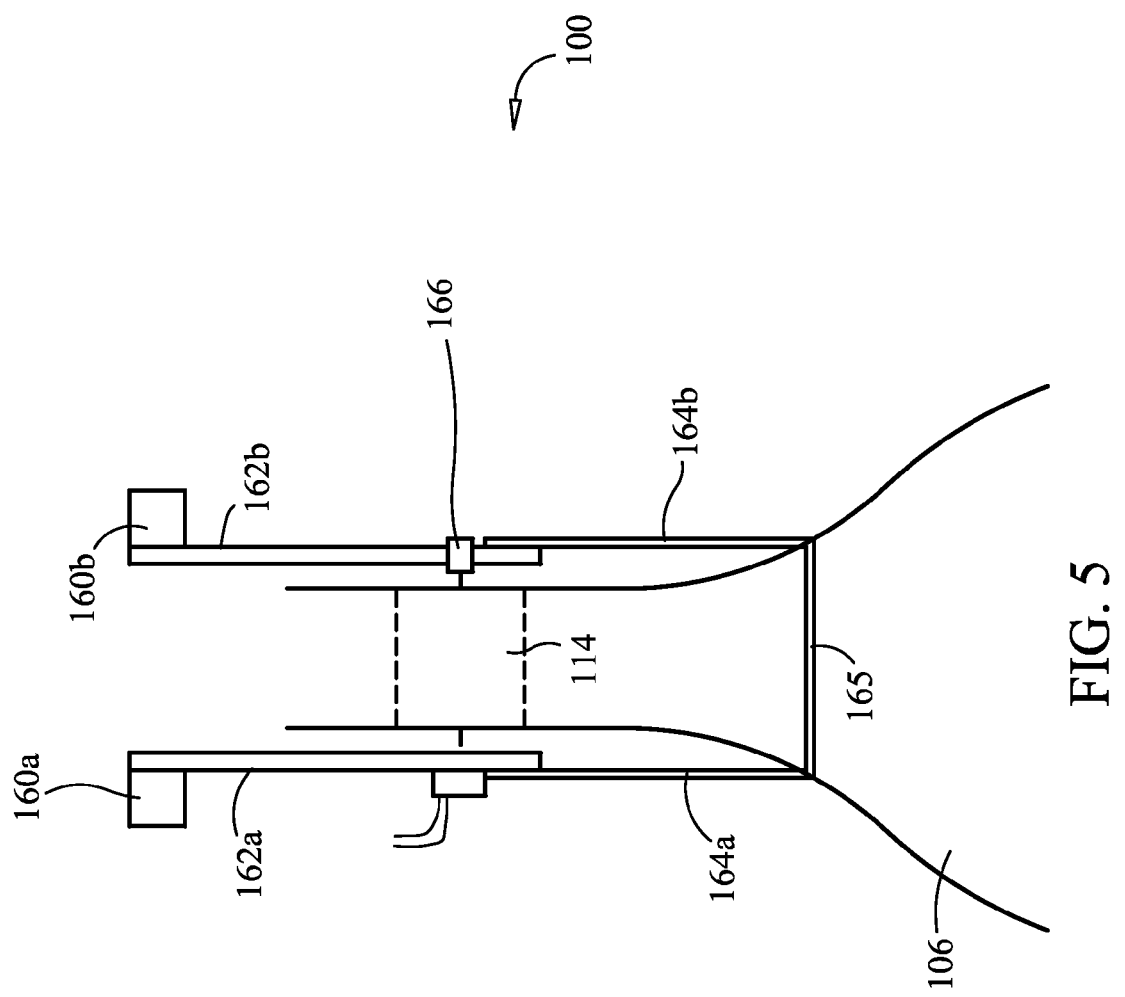
FIG. 5 is a fragmentary, top plan view of a bag collecting roller in accordance with the present disclosure.

As can be gleaned from FIG. 4, the collection auger 120 is positioned above the ground 103 such that it does not directly contact either the ground 103 or the bottom of the storage bag 106. Preferably, the vertical spacing between the auger 120 and the ground 103 can be effectively adjusted by substituting pairs of support wheels 117 having various diameters. One might elect to adjust spacing between the auger 120 and the bottom of the storage bag 106 resting on the ground 103 based upon factors such as: (a) the granularity of material being unloaded from the storage bag 106; or (b) auger height positioning necessary to achieve a desired rate of removal of the material from the storage bag 106. Accordingly, if the unloader 100 is being used to unload a fine grain (e.g., wheat) from a storage bag 106, the auger 120 may need to be positioned closer to the ground 103 than would be the case if silage or another more coarse material were being unloaded therefrom.

As can be seen in FIG. 3, the auger 120 includes a rotating helical blade or flighting 128. In operation, as the auger blade 128 rotates and comes into contact with material contained within the storage bag 106, the blade 128 gathers a quantity of the material and moves it axially along the laterally disposed auger 120—from its outer ends towards a longitudinal centerline CL of the entire collection assembly 108. In so doing, the gathered material is deposited onto a longitudinally disposed and inclined conveyor 122 positioned at the lateral center of the auger 120. In the embodiment depicted in FIGS. 2 and 3, the conveyor 122 is a chain conveyor. However, it will be generally understood by those of ordinary skill in the art that virtually any mechanism capable of cooperating with the auger 120 to transport material out of the storage bag 106 could be used in place of the conveyor 122. For examples, a belt conveyor, screw conveyor, elevator or other similar mechanism could be employed. Moreover, it will be understood by those of ordinary skill in the art that a suction mechanism (not shown) could be employed, instead of an auger 120 and conveyor 122, as the collection assembly.

Referring again to FIGS. 1-4, the conveyor 122 carries material away from the auger 120 and deposits it into a temporary holding bin 112. The holding bin 112 serves to temporarily retain the material in the course of it being transferred from the collection assembly 108 to the discharge assembly 110 of the collection mechanism. In one embodiment, the holding bin 112 is secured to the lateral support member 158 of the frame assembly 104. In another embodiment, the bin 112 is suspended from the frame assembly 104 by cables.

The discharge assembly 110 is configured to remove material from the holding bin 112. As shown in FIG. 6, a proximal end 113 of the discharge assembly 110 is situated within the holding bin 112 while a distal end 115 is extended away from the entire frame assembly 104. Preferably, and as depicted in FIG. 6, the discharge assembly 110 comprises an auger 172 disposed within a chute 174. As the discharge auger 172 rotates, its proximal end 113 engages material collected in the holding bin 112, and that material is moved toward and then out of the distal end 115 of the chute 174. Of course, while the presently described embodiment contemplates using an auger and chute assembly to move the material, it will be generally understood by those of ordinary skill in the art that any mechanism capable of moving the material in a similar fashion can be used, such as a conveyor, elevator, suction chute or other mechanism. The material being unloaded using the unloader 100 is ultimately discharged into another storage and/or transport receptacle, such as a trailer 180 (see FIG. 6) operating in conjunction with the unloader 100.

Prior to operating the unloader 100, an end of the storage bag 106 should be tied or otherwise fastened to a roller 114 which is part of the frame assembly 104. In the disclosed embodiment, the roller 114 is rotatably secured to the frame assembly 104 at the distal ends of two support arms 162 which are connected, at their respective proximal ends, to two vertical support columns 160. The two vertical support columns 160 extend upwards from and are substantially perpendicular to the lateral support member 158 to which the drive wheels 116 are rotatably connected. As illustrated, the roller 114 is positioned vertically higher than the collection assembly 108 and the discharge assembly 110. Therefore, as material is being removed from the storage bag 106, the roller 114 is capable of gradually drawing up and spooling the emptied portion the storage bag 106. A pair of bifurcated guide members 164 that extend rearward from the support arms 162 and the vertical support columns 160, as well as a lateral crossbar 165 that spans between the guide members 164, help to direct the emptied storage bag 106 as it is being drawn toward the roller 114. Also, as seen in FIG. 1, a sharpened cutting blade 119 which juts down from the underside of the conveyor 122 splits open the bottom of storage bag 106 as it pulled up by the roller 114. This cutting action prevents the storage bag 106 from enveloping the entire conveyor 122.

The roller 114 can be motor driven. In the embodiment shown in FIG. 2, for example, a motor 178 is provided at a support arm 162a. As mentioned above, the motor 178 can be externally powered by a tractor 102. Additionally, the tension in the storage bag 106 being wound around the roller 114 is monitored, using a pressure regulator 166 attached to the frame assembly 104, in order to control the rotational speed of the roller 114. In particular, as material is unloaded from the storage bag 106, tension in the emptied portion of the bag 106 decreases and causes that bag portion to become slacked or less taut. When this tension falls below a preset level, the pressure regulator 166 activates the roller's hydraulic motor 178, causing the roller 114 to rotate and wind up the slackened bag 106. Then, when tension in the storage bag 106 exceeds the preset level, the pressure regulator 166 deactivates the motor 178 and stops the winding action. In so doing, the roller 114 automatically collects and winds the emptied bag 106 in accordance with the rate at which material is being unloaded therefrom.

The unloader 100 further includes an "actuation assembly" attached at the frame assembly 104. The actuation assembly is configured to control the movement of the unloader 100 by controlling operation of the drive mechanism in direct response to resistance force exerted on the moving unloader 100 by virtue of its impingement on material within the storage bag 106. In this regard, by "control," it is generally meant that the actuation assembly is configured to stop and then restart movement of the frame assembly 104 in accordance with the aforedescribed resistance force that the storage bag 106 delivers against it. Of course, while an actuation assembly comprising a particular assembly of linkage arms is illustrated herein and described infra, it should be understood that the actuation assembly could comprise any suitable components that, together, function to: (1) engage the storage bag 106, (2) measure or otherwise respond to force exerted by the storage bag (due to rearward movement of the unloader 100) and (3) control further rearward movement of the unloader 100 along the direction D of the storage bag 106 dependent upon the magnitude of force exerted.

One possible embodiment of an actuation assembly is shown in FIG. 4. In this embodiment, the actuation assembly comprises a linkage arm 142 and a two-segment actuator member 144, 146. As shown, a vertical segment 146 of the actuator member extends downward from and is substantially perpendicular to its horizontal segment 144. In this orientation, the vertical segment 146 is positioned in contact with the storage bag 106. Additionally, a biasing member 145, such as a spring, elastic strap, or other similar device, is attached between the horizontal segment 144 and the frame assembly 104 such that the entire actuation assembly is biased towards the rear end 107 of the frame assembly 104. In so being, the actuator member 144, 146 remains in continual contact with the storage bag 106 during operation of unloader 100.

The linkage arm 142 component of the actuation assembly is operatively connected to a switch 148 which controls operation of the motors 176a, 176b that power the drive wheels 116a, 116b. During operation, once the actuator member 144, 146 travels a predetermined distance towards the rear end 107 of the frame assembly 104, the linkage arm 146 will trigger the switch 148. This actuates the drive motors 176a, 176b and powers the drive wheels 116a, 116b, causing the unloader 100 to move, along the direction D, towards the storage bag 106. In so moving, the collection assembly 108 encounters additional material contained within the storage bag 106 that pushes the actuator member 144, 146 back towards the front end 105 of the frame assembly 104. Resulting forward movement of the linkage arm 142 then deactivates the switch 148 and causes rearward movement of the frame assembly 104 to slow or stop. Then, as a portion of the storage bag 106 becomes slackened due to material being removed therefrom, the biasing member 145, again, forces the actuator member 144, 146 rearward, and the entire process may be repeated. By automatically controlling movement of the unloader 100 in this manner, the actuation assembly effectively minimizes the chance that the contents of the storage bag 106 will jam the collection assembly 108 and eliminates the need to manually control advancement of the unloader 100 in a manner specifically responsive to the dimensions of a particular storage bag or characteristics of a particular agricultural material being unloaded.

While the aforedescribed and other mechanical means can be utilized to effectively control operation of the unloader's drive mechanism, it will be generally understood by those of ordinary skill in the art that a sensor arrangement (not shown) configured to measure the resistance force exerted on the unloader 100 due to its impingement on material within the storage bag 106 and to similarly control the drive mechanism in response could alternatively be employed.

While the invention has been particularly shown and described as referenced to the embodiments thereof, those skilled in the art will understand that the foregoing and other changes in form and detail may be made therein without departing from the spirit and scope of the invention.

What is claimed is:

1. An apparatus for automatically unloading material from an elongate storage bag, the apparatus comprising:
  a collection mechanism that removes e material from the bag;

a drive mechanism that advances the apparatus along the direction of the bag; and an actuation assembly that automatically controls the drive mechanism responsive to the degree of resistance to advancement experienced by the apparatus due to the presence of material within the bag, wherein the actuation assembly itself comprises:

an actuator member that is spring-biased; and a switch that actuates the drive mechanism and is operatively manipulated by the actuator member;

wherein resistance encountered the actuator member, due to the presence of material within the bag and advancement of the apparatus in the direction of the bag, moves the actuator member against its bias which, in turn, causes the switch to deactivate the drive mechanism in order to cease advancement of the apparatus; and wherein subsequent spring-driven return movement of the actuator member causes the switch to activate the drive mechanism in order to resume advancement of the apparatus.

2. An apparatus for automatically unloading material from an elongate storage bag, the apparatus comprising:

a collection mechanism that removes the material from the bag;

a drive mechanism that advances the apparatus along the direction of the bag;

an actuator member that is spring-biased;

a switch that actuates the drive mechanism and is operatively manipulated by the actuator member;

wherein resistance encountered the actuator member, due to the presence of material within the bag, moves the actuator member against its bias which, in turn, causes the switch to deactivate the drive mechanism in order to cease advancement of the apparatus; and wherein subsequent spring-driven return movement of the actuator member causes the switch to activate the drive mechanism in order to resume advancement of the apparatus.

3. The apparatus of claim 2, wherein the collection mechanism comprises:

an auger that collects the material from within the bag;

a conveyor that transports the collected material away from the auger; and a receptacle that receives the collected material from the conveyor.

4. The apparatus of claim 2, wherein the collection mechanism comprises:

a suction mechanism that draws material out of the bag by suction action; and a holding container into which the suction drawn material is deposited.

5. The apparatus of claim 2, wherein the apparatus further comprises a. roller that spools the emptying bag as the apparatus advances along the direction of the bag.

* * * * *